United States Patent [19]
Robinson et al.

[11] Patent Number: 5,822,100
[45] Date of Patent: Oct. 13, 1998

[54] METHOD AND SYSTEM FOR EQUALIZING PMD USING INCREMENTAL DELAY SWITCHING

[75] Inventors: Andrew Niall Robinson; John A. Fee, both of Plano, Tex.

[73] Assignee: MCI Communications Corporation

[21] Appl. No.: 670,686

[22] Filed: Jun. 26, 1996

[51] Int. Cl.$^6$ ................................................... H04B 10/00
[52] U.S. Cl. ......................... 359/161; 359/156; 359/140
[58] Field of Search .................................. 359/122, 140, 359/156, 161; 250/227.12

[56] References Cited

U.S. PATENT DOCUMENTS 5,659,412   8/1997   Hakki ...................................... 359/156

OTHER PUBLICATIONS

B. W. Hakki, "Polarization Mode Dispersion Compensation by Phase Diversity Detection", IEEE Photonics Technology Letters, vol. 9, No. 1, pp. 121–123. Jan. 1997.

Ono et al., "Polarization Control Method for Suppressing Polarization Mode Dispersion Influence in Optical Transmission Systems," *Journal of Lightwave Technology* vol. 12, No. 5, pp. 891–898, May, 1994.

Ozeki et al., "Polarization–Mode–Dispersion Equalization Experiment Using a Variable Equalizing Optical Circuit Controlled by a Pulse–Waveform–Comparison Algorithm," Tuesday Afternoon, *OFC '94 Technical Digest*, pp. 62–64, 1994.

Takahashi et al., "Automatic Compensation Technique for Timewise Fluctuating Polarisation Mode Dispersion in In–Line Amplifier Systems," *Electronics Letters*, vol. 30, No. 4, pp. 348–349, Feb. 17, 1994.

*Primary Examiner*—Kinfe-Michael Negash

[57] ABSTRACT

A polarization mode compensation system and method using optical switch elements to establish incremental delays between different polarization modes of an optical data signal is provided. A polarization mode separator separates the optical data signal into first and second orthogonally polarized optical signals. A first variable switching delay element provides a first incremental propagation delay for the first polarized optical signal. A second variable switching delay element provides a second incremental propagation delay for the second polarized optical signal. The first and second variable switching delay elements consist of a series of optical switches optically interconnected by different incremental lengths of optical fiber. For example, 2×2 optical switches are provided for switching between a reference fiber segment and a respective delay fiber segment to provide a relative incremental propagation delay. A controller controls optical switches in the first and second variable switching delay elements to set first and second incremental propagation delays. In particular, the first and second polarized optical signals are incrementally delayed relative to one another so as to compensate for polarization mode dispersion. A beam combiner then combines the first and second polarized optical signals to form an optical output data signal which can be detected accurately by a receiver without the effects of polarization mode dispersion. In this way, optical data signals can be reliably transmitted over greater distances along a long-haul fiber optic dispersive medium at even greater bit-rates and bandwidth.

13 Claims, 4 Drawing Sheets

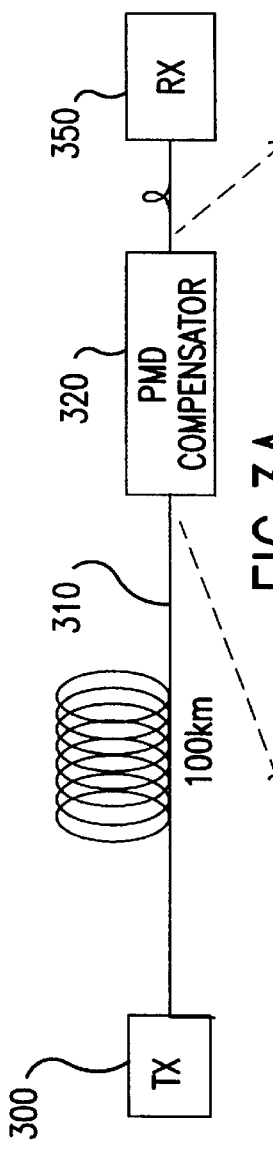
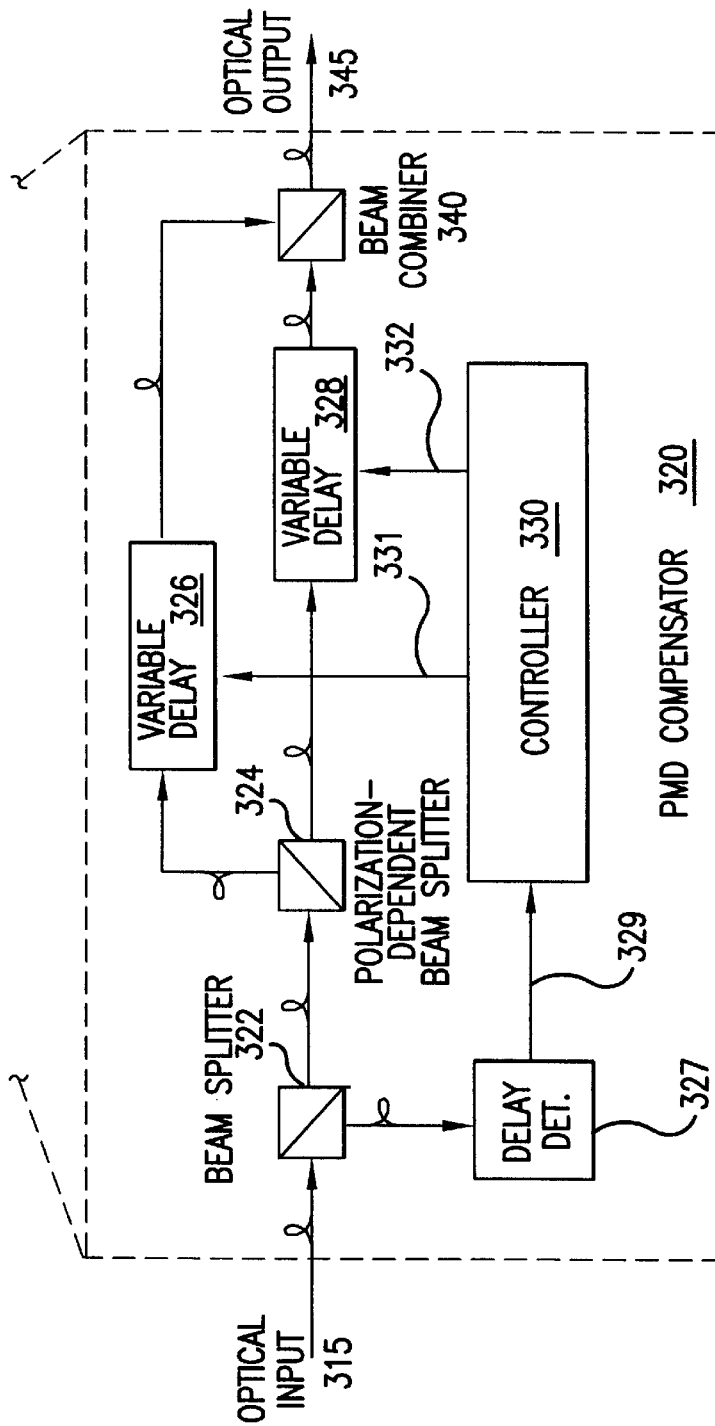

METHOD AND SYSTEM FOR EQUALIZING PMD USING INCREMENTAL DELAY SWITCHING

BACKGROUND OF THE INVENTION

1. Field of the Invention

The present invention relates to fiber optic transmission and communication.

2. Related Art

Polarization-Mode Dispersion (PMD)

Fiber optics technology is revolutionizing the telecommunications field. The main driving force is the promise of extremely high communications bandwidth. At high bandwidths, a single beam of modulated laser light can carry vast amounts of information—equal to hundreds of thousands of phone calls or hundreds of video channels.

However, pulse broadening limits the effective bandwidth and propagation distance of an optical communication signal. Because of the inherent dispersive nature of an optical fiber medium, all portions of a light pulse do not travel at the same speed through an optical fiber causing pulse broadening.

FIG. 1 illustrates how pulse broadening arises from varying light propagation delays which eventually distorts light output. Digital input pulses 100 are input to an optical fiber medium 110. The amplitude-modulated pulses are generated by a modulated laser source, such as a direct-modulated laser or an externally-modulated laser.

Different portions of a light pulse encounter varying propagation delays arising from, inter alia, the varying lengths of reflected paths within optical fiber 110. For clarity, three paths are illustrated which correspond to a relatively straight, short path 100a, a reflected, intermediate length path 100b, and a relatively long, reflected path 100c. Due to the varying propagation delays, see, e.g., the Δt delay in arrival time between 100a and 100b, the combined optical output is distorted. Thus, a photoreceptor detecting the output pulses 100a–100c will generate a distorted output 120.

As shown in FIG. 2, such pulse broadening can lead to symbol confusion. "Pulse broadening" is called "dispersion" or "spreading" because of the non-uniform way in which parts of the incident signal 200 propagate through a dispersive fiber medium. In a mild form of dispersion, the transitions between ON and OFF states observed at a receiver are not as abrupt and distinct as the transitions that were originated by a transmitting laser. More severe blurring in the time domain limits the useful bandwidth of the path. In FIG. 2, dispersion effects have broadened two closely spaced pulses to the extent that they are almost indistinguishable, as indicated by a question mark in the output signal 220. This will cause an information bit to be received erroneously, with perhaps disastrous results on network communication and customer dissatisfaction.

Several refinements have been made to reduce dispersion and increase the useful bandwidth. First, single-mode fiber was developed having a slender core such that there is essentially only a single light path through the fiber. Secondly, the distributed feedback (DFB) laser was developed with an extremely narrow distribution of output wavelengths. This minimizes chromatic dispersion caused by the fact that different wavelengths travel at slightly different speeds through a fiber. Finally, a dispersion-shifted fiber material was produced to minimize the speed-vs-wavelength dependency at a specific wavelength of 1550 nm. common in telecommunication applications.

Cumulatively, recent improvements in fiber materials and transmitter devices have reduced pulse dispersion and increased working bandwidth. "Lightwave" technology has advanced at such a pace that the bandwidth capabilities have more than doubled every two years. As a result, working bandwidths, expressed in terms of digital bit-per-second rates, have escalated from 500 Mbps to 10 Gbps.

Problem Solved by the Invention

These progressively more exotic refinements have brought the technology forth to a new bandwidth barrier: polarization-mode dispersion (PMD). Previously, PMD was insignificant in magnitude relative to other dispersive effects, but now it is a limiting factor. It is well known that light can be polarized and that, for a given beam of light, this polarization may be expressed in terms of two orthogonal axes that are normal to the axis of propagation. As a beam of light propagates through a fiber, the light energy present along one such polarization may leak into the other polarization. This would normally be of no consequence (lightwave receivers will detect both polarizations), except that real world fibers carry different polarizations at slightly different speeds. This effect can be on the order of 10–20 picoseconds (ps) in a 100 km fiber and becomes important when the modulating pulses are 50–100 ps. in width. To complicate matters, the polarization dispersion within a given fiber changes as a function of time and temperature. Therefore, an effective PMD compensation mechanism must monitor and adapt to the changes so as to keep PMD to a minimum.

To nullify the effects of PMD, researchers have suggested an adaptive compensation device be applied in an optical path at the receive end just before the receiving transducer. These compensators typically employ a detector for analyzing the relative partitioning and delay of the incoming signal along two orthogonal polarizations. The compensators correct a data signal by purposefully adding delay selectively to one polarization or another. A controller interprets the findings of the delay analyzer and manipulates adjustable delay elements so as to compensate for the polarization-dependent delay differences caused by the imperfect fiber transmission path. However, these techniques are not practical in telecommunication applications, such as, long-haul optical fiber communication.

The variable delay elements are usually optical fibers that are either heated or squeezed to alter the propagation characteristics. While these elements are adaptable to laboratory electronic control techniques, they are inadequate in terms of reproducibility and predictability of response. They are also impractical for use in a commercial traffic-bearing fiber network wherein recovery time following an equipment or power failure should be minimized. See, e.g., Ozeki, et al., "Polarization-mode-dispersion equalization experiment using a variable equalizing optical circuit controlled by a pulse-waveform-comparison algorithm," OFC '94 Technical Digest, paper TuN4, pp. 62–64; Ono, et al., "Polarization Control Method for Suppressing Polarization Mode Dispersion Influence in Optical Transmission Systems", Journal of Lightwave Technology, Vol. 12, No. 5, May 1994, pp. 89–91; Takahasi, et al., "Automatic Compensation Technique for Timewise Fluctuating Polarization Mode Dispersion in In-line Amplifier Systems", Electronics Letters, Vol. 30, No. 4, February 1994, pp. 348–49 (each of which is incorporated in its entirety herein by reference).

What is needed is a method and system for equalizing PMD to improve bandwidth, distance, and optical communication quality. Further, a PMD compensation method and system is needed which is reliable, responsive, and effective in telecommunication networks.

SUMMARY OF THE INVENTION

The present invention provides a system and method for compensating for polarization mode dispersion (PMD) in an optical data signal using optical switch elements to provide incremental delays between different polarization modes of the optical data signal.

In one embodiment, a polarization mode separator separates the optical data signal into first and second orthogonally polarized optical signals. A first variable switching delay element provides a first incremental propagation delay for the first polarized optical signal. A second variable switching delay element provides a second incremental propagation delay for the second polarized optical signal. A controller controls optical switches in the first and second variable switching delay elements to set first and second incremental propagation delays. In particular, the first and second polarized optical signals are incrementally delayed relative to one another so as to compensate for polarization mode dispersion. A beam combiner then combines the first and second polarized optical signals to form an optical output data signal which can be detected accurately and reliably by a receiver without the effects of polarization mode dispersion. In this way, optical data signals can be transmitted over greater distances along a long-haul fiber optic dispersive medium at even greater bit-rates and bandwidth.

In one aspect of the present invention, a beam splitter diverts a portion of an input optical data signal to a delay detector. The delay detector detects a relative delay between orthogonal polarization modes of the optical data signal due to polarization mode dispersion. The controller then uses the detected relative delay to control the first and second variable switching delay elements so to counteract the detected relative delay.

According to a further aspect of the invention, the first and second variable switching delay elements consist of a series of optical switches optically interconnected by different incremental lengths of optical fiber. 2×2 optical switches are provided for switching between a reference fiber segment and a delay fiber segment to provide a relative incremental propagation delay. Different 2×2 optical switch configurations can be used including arrangements utilizing semiconductor optical amplifiers or Mach-Zehnder switches.

Compared to other known technologies, the present invention is more reliable and predictable in its response and is therefore more mass-producible. Furthermore, it has an extremely fast response time that is independent of the degree of delay adjustment needed. This is a particular advantage in a missioncritical high data rate optical communications network. The application and commercialization of this invention is very timely as the optical network technologies will hit the PMD barrier in the immediate future.

Further features and advantages of the present invention, as well as the structure and operation of various embodiments of the present invention, are described in detail below with reference to the accompanying drawings.

BRIEF DESCRIPTION OF THE FIGURES

The accompanying drawings, which are incorporated herein and form part of the specification, illustrate the present invention and, together with the description, further serve to explain the principles of the invention and to enable a person skilled in the pertinent art make and use the invention.

FIG. 3A shows an optical communication link having an automatically controlled PMD compensator according to the present invention.

FIG. 3B is a detailed block diagram of the PMD compensator shown in FIG. 3A.

Figure 1:
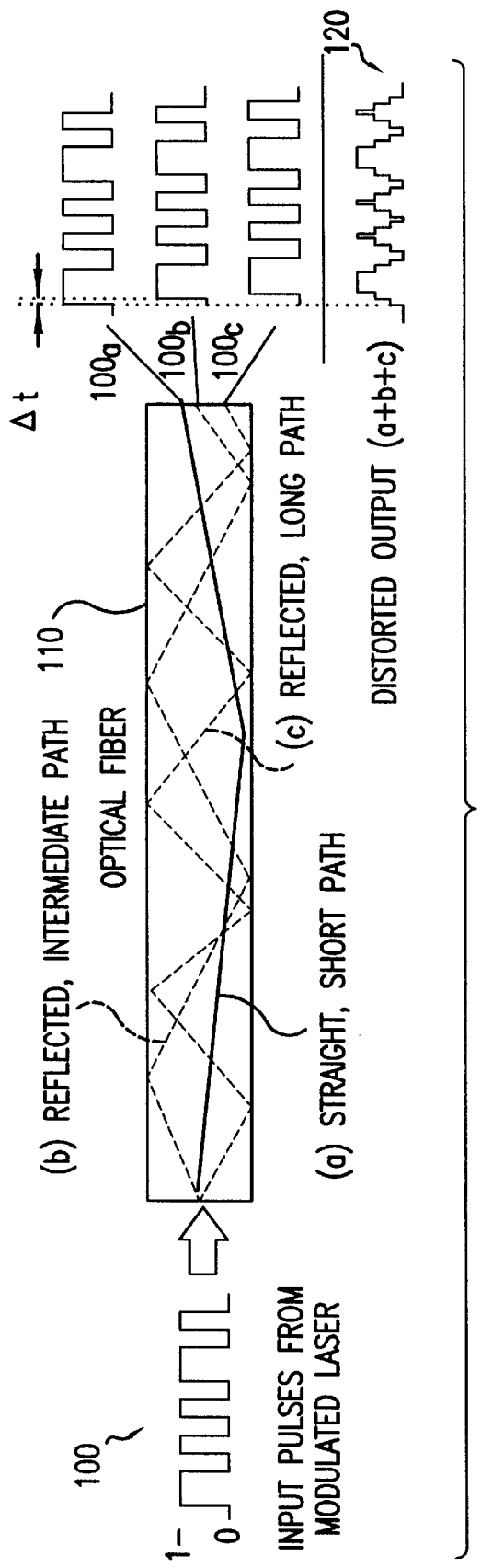
FIG. 1 shows the phenomenon of pulse broadening through a dispersive optical fiber.
Figure 2:
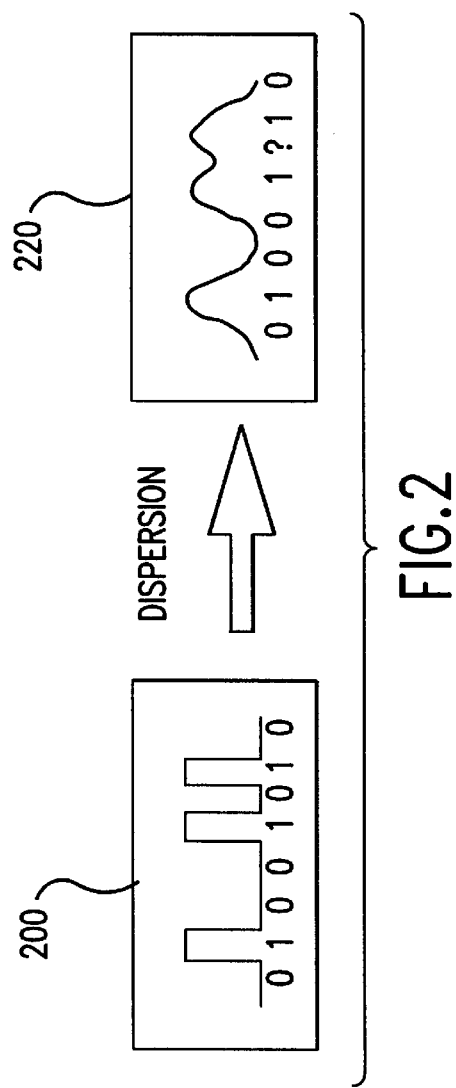
FIG. 2 shows the symbol confusion caused by pulse broadening.

The present invention will now be described with reference to the accompanying drawings. In the drawings, like reference numbers indicate identical or functionally similar elements. Additionally, the left-most digit(s) of a reference number typically identifies the drawing in which the reference number first appears.

DETAILED DESCRIPTION OF THE PREFERRED EMBODIMENTS

The present invention is a PMD compensator based upon delay elements that use optical switching to add well-defined increments of delay to either polarization of an optical signal. The apparatus of the invention is depicted in FIGS. 3A and 3B of the attached drawings.

FIG. 3A shows a typical end-to-end network path. A transmitter 300 transmits an optical data signal through an optical fiber 310 for detection by a receiver 350. For example, transmitter 300 can be a DFB laser modulator or any other type of modulated light source for producing an optical data signal. Optical fiber 310 is a long-haul, single-mode, dispersion-shifted fiber approximately 100 kilometers in length. More generally, any type of optical fiber can be used. Additional fibers, line amplifiers, and/or repeaters can also be included between the transmitter 300 and receiver 350. Receiver 350 can be any suitable photodetector for detecting the modulated optical data signal.

A polarization-mode dispersion (PMD) compensator 320 is provided along optical fiber 310 near the receiver 350. According to the present invention, the PMD compensator 320 equalizes PMD which further increases bandwidth and transmission range. For example, given the presence of PMD compensator 320, transmitter 300 can transmit modulated laser data on the order of 1 to 100 Gb/s (gigabits/sec), or more, over a 100 km. single-mode fiber without symbol confusion. Receiver 350 can detect the output reliably and accurately in a telecommunication environment.

FIG. 3B shows a block diagram of the components of the PMD compensator 320 in accordance with one embodiment of the present invention. Optical paths are indicated generally by a loop along the transmission path. The optical data signal traveling through optical fiber 310 enters beam splitter 322 as optical input 315. A portion of the optical input 315 is diverted to a delay detector 327. The delay detector detects delays between two orthogonal polarization modes of the detected light. The operation and implementations of such delay detectors is well-known and need not be described in further detail.

The majority of the optical input 315 passes through beam splitter 322 to a polarization-dependent beam splitter 324. The polarization-dependent beam splitter is a type of polarization mode separator which separates the optical input 315 into two optical signals that are orthogonally polarized with respect to one another. The two polarized signals travel along two separate paths leading through respective variable switching delay elements 326, 328. Each of the variable switching delay elements 326, 328 provides a respective incremental delay to optical signals passing therethrough to equalize or compensate for PMD. After passing through the delay elements 326, 328, the two orthogonally polarized optical signals are recombined by beam combiner 340. An optical output 345 having little or no polarization-mode dispersion is then returned to optical fiber 310 and/or receiver 350.

The degree of incremental delay, if any, imparted by the variable switching delay elements 326, 328 is governed by control signals received over respective control lines 331 and 332 from a controller 330. Controller 330 receives data output from the delay detector 327 representing the magnitude of PMD over an output line 329. Controller 330 then processes the data and generates control signals for the variable switching delay elements 326, 328 to counteract the PMD effects of the long transmission path along fiber 310. In particular, the controller 330 sets optical switches within the variable switching elements 326, 328 to apply an incremental relative propagation delay between the orthogonally polarized signals which compensates for the delay detected by delay detector 327. Because PMD is compensated through optical switching, an extremely fast response time to detected delay, e.g., on the order of nanoseconds, can be achieved that is independent of the degree of delay adjustment.

Note that in FIG. 3B, two delay elements are applied so that either polarization can be retarded with respect to the other. Another variation can use a single delay element to provide a relative propagation delay. Also, one or more rotatable polarizers can be used at the polarization beam splitter 324 to select a polarization component at any degree of rotation as the two optical signals passing through the switching delay elements 326, 328 do not necessarily have to be orthogonally polarized.

An important feature of the present invention is the implementation of the variable switching delay elements 326, 328. Each of these switching delay elements have a similar structure and operation. Accordingly, only one switching delay element need be described in detail.

Figure 4:
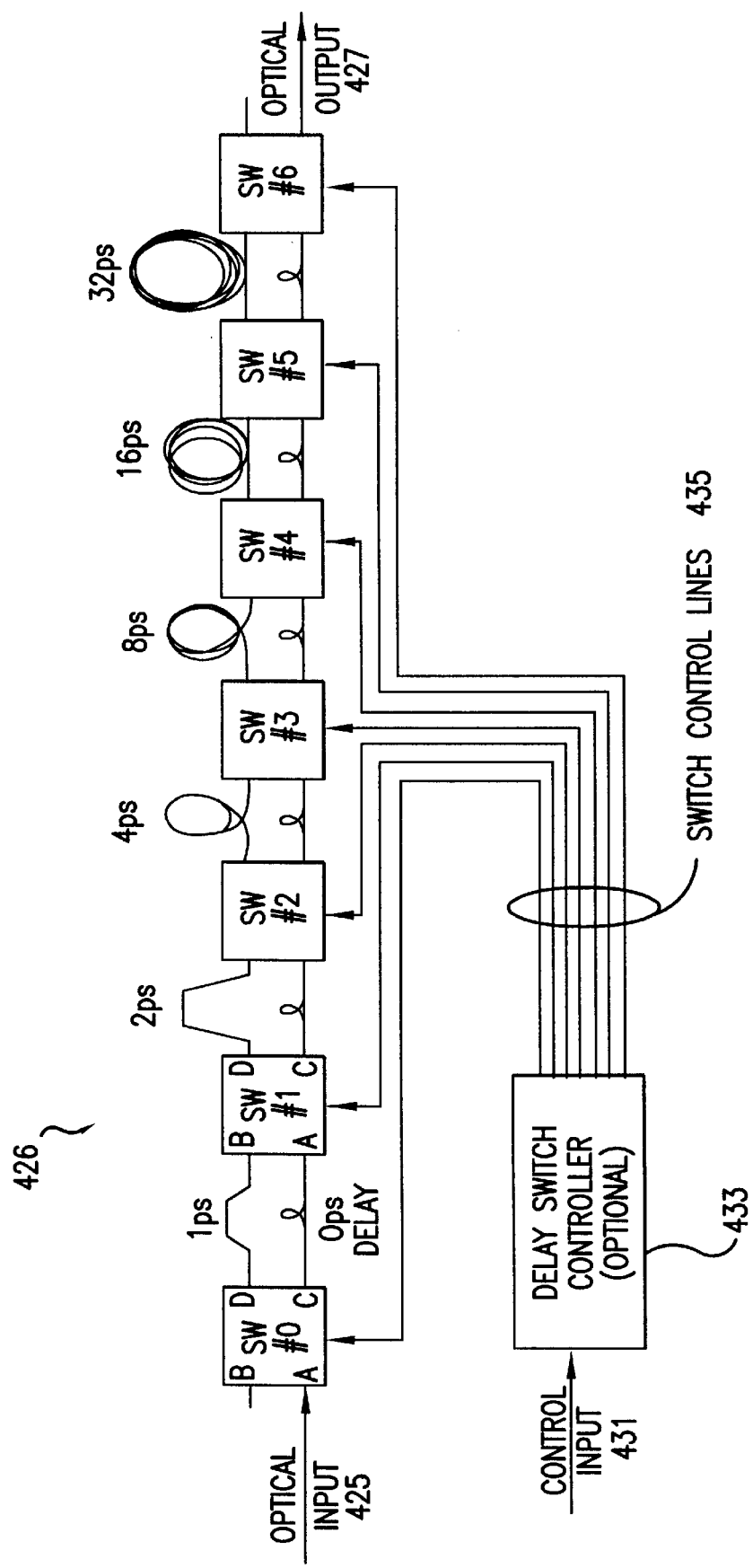
FIG. 4 shows a controlled, variable incremental delay switching element using optical switches and fixed delay elements.

FIG. 4 shows a detailed example of one variable switching delay element 426 used in the present invention. A series of optical switches SW0–SW6 are connected in stages by different incremental lengths of fiber. At each stage, an optical switch SW0–SW6 can switch an optical signal over a reference fiber segment or a delay fiber segment which is longer than the reference fiber segment so as to introduce an incremental propagation delay. Depending upon how each switch SW0–SW6 is set, an optical output 427 can be delayed by different incremental time intervals.

For example, switch SW0 is a 2×2 optical cross-connect switch having four ports A to D. In one switch configuration, switch SW0 can simultaneously connect port A to port C and connect port B to port D. Optical input 425 would exit port C and travel along a reference fiber segment 440 experiencing no relative propagation delay, e.g., 0 picoseconds. Alternatively, SW0 can switch optical input 425 to pass from port A to exit port D for transmission over a delay fiber segment 441. The delay fiber segment 441 is longer than the reference fiber segment 440 by a predetermined amount calculated to introduce a one picosecond propagation delay compared to the transit time for light traveling through the reference fiber segment 440.

As shown in FIG. 4, the switching stages introduce progressively more delay. In particular, the arrangement of FIG. 4 uses delay values that progress geometrically by powers of two from one to 32 picoseconds for the individual stages. However, the switching delay element 426 can represent any integral number delay value from 0 picoseconds to 63 picoseconds by varying the switched state of the optical switches SW0–SW6. Many other value assignments for the propagation delay are certainly possible and have been contemplated. The use of many low picosecond values is preferred for high data rate communications because the stepwise introduction of large delay values can cause momentary signal disruption.

Thus, the above propagation delays in the switching delay element 426 are illustrative and can be varied by adding more or less stages and changing the reference fiber lengths. Further, at each switching stage, other optical delay elements can be used in combination with or instead of the optical delay segments to apply a propagation delay. Also, multi-port cross-connect switches having more than two ports on a side, e.g., N×N optical cross-connects where N=3, 4, 8, or more, can be used to allow multiple delay fiber segments to introduce a greater variety of incremental delays at each stage.

Each of the optical switches SW0–SW6 is controlled through control lines 435 based on a control input 431 output from controller 330 to set a desired propagation delay. A further optional delay switch controller 433 is included in FIG. 4 to simplify the control task for an external controller 330. Delay switch controller 433 accepts a relatively simple control input 431, such as, a request for a particular propagation delay time or a command to increment or decrement a delay time. In response to control input 431, delay switch controller 433 then coordinates the actions of the individual switches SW0–SW6 so as to accommodate the request. This might be useful to implement a standard interface to a wide range of variable delay devices. Alternatively, the functionality of the delay switch controller 433 can be incorporated in the external controller 330.

Figure 5B:
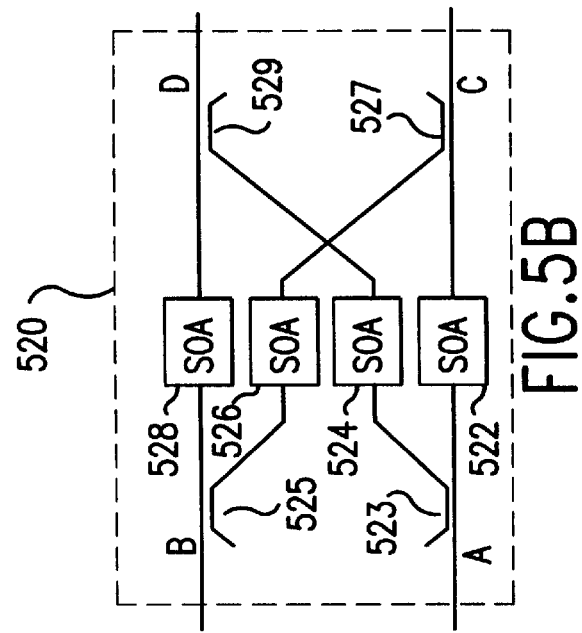
FIG. 5A, 5B, 5C and 5D illustrate examples of optical switches for use in the present invention.
Figure 5D:
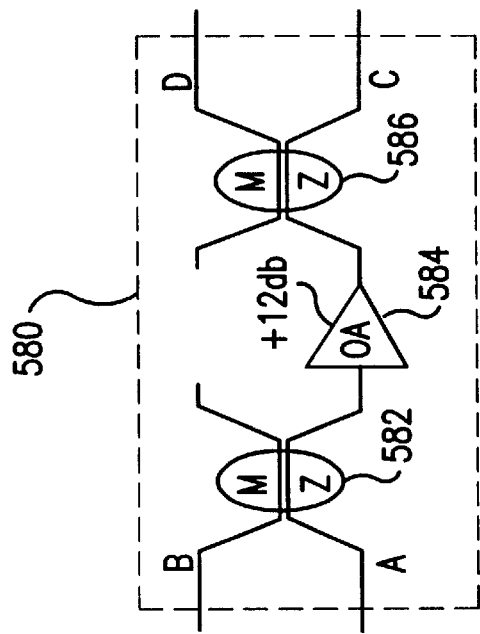
Figure 5A:
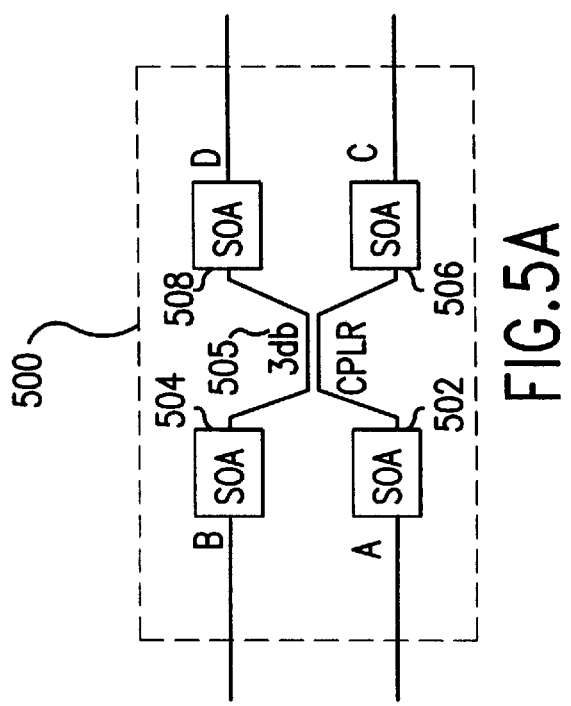

Several possible constructions of the individual 2×2 optical switches SW0 to SW6 are shown in FIGS. 5A to 5D. FIG. 5A shown one 2×2 switch 500 having four semiconductor optical amplifiers (SOAs) 502, 504, 506, 508 at each port A to D respectively. A 3 db (loss) coupler 505 interconnects optical paths between the pair of SOAs 502, 504 and the pair of SOAs 506, 508. As is well known, these optoelectronic SOA devices can provide optical gain and switching capability by adjusting the electrical bias current at a gate that drives the devices. For example, if SOA 502 is biased "on," an optical signal at port A can pass through SOA 502 to 3 db coupler 505. The optical signal may be further switched (and amplified) to exit port C and/or D with little or no loss by turning on SOA 506 and SOA 508 respectively.

Another 2×2 switch variation is shown in FIG. 5B having four couplers 523, 525, 527, and 529 at each port A to D to form four optical paths cross-connected between the ports A to D. Four SOAs 522–528 are provided for switching and amplifying optical signals passing along the four optical paths. Although more couplers are used, this configuration has the advantage that A–D and B–C connections are possible without mixing optical signals input at ports A and B.

Figure 5C:
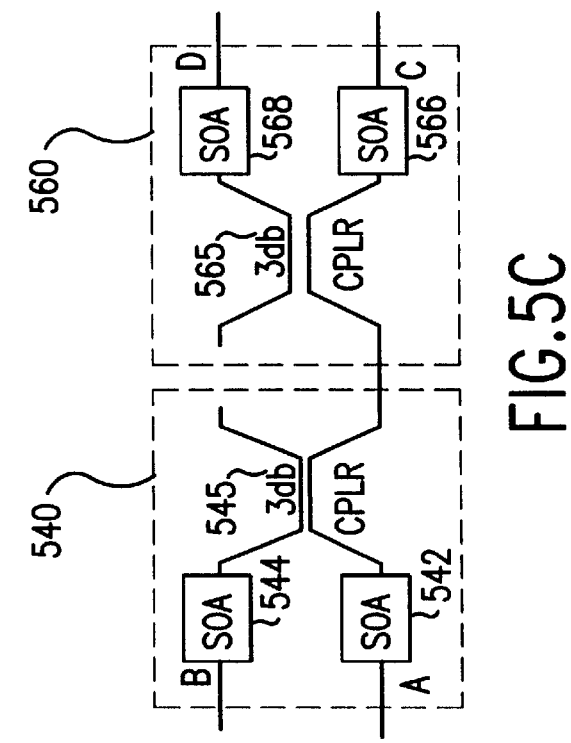

FIG. 5C shows a further variant that separates switch 500 into two half-switches 540, 560. Half-switch 540 has two SOAs 542, 544 at ports A and B connected to a 3 db coupler 545. Half-switch 560 has two SOAs 566, 568 at ports C and D connected to a 3 db coupler 565. The two 3 bd couplers 545 and 546 optically couple the two half-switches 540, 560. A stage with such a half-switch at either end forms a modular unit. This can be useful from a design and implementation standpoint. As with the other switch designs, this arrangement can be made lossless by using the SOAs 542, 544, 566, 568 to provide some gain.

Finally, FIG. 5D shows a switch 580 having well-known Mach-Zehnder electro-optic switches 582, 586 to route the optical signals between ports A to D under the influence of electrical field gradients. A fixed gain block 584, such as, an optical amplifier, is added to compensate for any inherent coupling loss of the Mach-Zehnder switches 582, 586.

The present invention is described in the example environment of a fiber communication network. Description in these terms is provided for convenience only. It is not intended that the invention be limited to application in this example environment. In fact, after reading the following description, it will become apparent to a person skilled in the relevant art how to implement the invention in alternative environments.

Conclusion

While various embodiments of the present invention have been described above, it should be understood that they have been presented by way of example only, and not limitation. It will be understood by those skilled in the art that various changes in form and details may be made therein without departing from the spirit and scope of the invention as defined in the appended claims. Thus, the breadth and scope of the present invention should not be limited by any of the above-described exemplary embodiments, but should be defined only in accordance with the following claims and their equivalents.

What is claimed is:

1. A system for compensating for polarization mode dispersion in an optical data signal traveling through an optical fiber comprising:

a polarization mode separator which separates the optical data signal into first and second polarized optical signals traveling along respective first and second optical paths;

a first variable switching delay element located along said first optical path for providing a first incremental propagation delay to said first polarized optical signal;

a second variable switching delay element located along said second path for providing a second incremental propagation delay to said second polarized optical signal;

a controller coupled to said first and second variable switching delay elements, said controller controls said first and second switching delay elements such that said first and second polarized optical signals have a relative propagation delay that compensates for polarization mode dispersion, said relative propagation delay corresponding to the difference between said first and second incremental propagation delays; and a beam combiner, optically coupled to said first and second optical paths downstream of said first and second variable switching delay elements, said beam combiner combining said first and second polarized optical signals output respectively from said first and second variable switching delay elements to form an optical output data signal compensated for polarization mode dispersion.

2. The system of claim 1, wherein the optical fiber comprises a long-haul communication link.

3. The system of claim 1, wherein said first and second polarized optical signals are polarized in orthogonal modes.

4. The system of claim 1, further comprising:

a beam splitter optically coupled between the optical fiber and said polarization mode separator; and a delay detector optically coupled to said beam splitter;

wherein said beam splitter diverts a portion of the optical data signal to said delay detector, said delay detector detects said portion of said optical data signals and outputs an electrical signal representative thereof, and said controller receives said electrical signal and generates control signals for setting optical switches in said first and second variable switching elements.

5. The system of claim 1, wherein said polarization mode separator comprises a polarization-dependent beam splitter.

6. The system of claim 1, wherein at least one of said first and second variable switching delay elements comprises:

a plurality of optical switches optically interconnected in series by different incremental lengths of optical fiber.

7. The system of claim 6, wherein each optical switch comprises a 2×2 optical switch for switching between a reference fiber segment and a respective delay fiber segment to provide a relative incremental propagation delay.

8. The system of claim 7, wherein at least one of said 2×2 optical switches includes a plurality of semiconductor optical amplifiers, each semiconductor optical amplifier providing at least one of optical gain and switching action based on a control signal output from said controller.

9. The system of claim 7, wherein at least one of said 2×2 optical switches includes two Mach-Zehnder electro-optic switches interconnected by an optical amplifier.

10. The system of claim 1, wherein at least one of said first and second variable switching delay elements comprises:

a plurality of different incremental delay stages interconnected by optical switches.

11. A method for compensating for polarization mode dispersion in an optical data signal traveling through an optical fiber comprising the steps of:

separating the optical data signal into first and second polarized optical signals;

outputting said first and second polarized optical signals along respective first and second optical paths;

optically switching said first polarized optical signal to provide an incremental relative propagation delay between said first and second polarized optical signals which compensates for polarization mode dispersion; and combining said first and second polarized optical signals to form an optical output data signal compensated for polarization mode dispersion.

12. The method of claim 11, further comprising the steps of:

diverting a portion of the optical data signal; and detecting a relative delay between orthogonal polarization modes of said portion of said optical data signal.

13. The method of claim 11, wherein said optically switching step comprises:

passing said first polarized optical signal through a plurality of optical switches optically interconnected in series by different incremental lengths of optical fiber.

* * * * *